(12) United States Patent
Weige

(10) Patent No.: US 11,505,146 B2
(45) Date of Patent: Nov. 22, 2022

(54) BUMPER FOR A MOTOR VEHICLE

(71) Applicant: Kirchhoff Automotive Deutschland GmbH, Attendorn (DE)

(72) Inventor: Michael Weige, Finnentrop (DE)

(73) Assignee: KIRCHHOFF AUTOMOTIVE DEUTSCHLAND GMBH, Attendorn (DE)

( * ) Notice: Subject to any disclaimer, the term of this patent is extended or adjusted under 35 U.S.C. 154(b) by 165 days.

(21) Appl. No.: 17/259,894

(22) PCT Filed: Aug. 8, 2019

(86) PCT No.: PCT/EP2019/071356
§ 371 (c)(1),
(2) Date: Jan. 12, 2021

(87) PCT Pub. No.: WO2020/035397
PCT Pub. Date: Feb. 20, 2020

(65) Prior Publication Data
US 2021/0221311 A1    Jul. 22, 2021

(30) Foreign Application Priority Data

Aug. 14, 2018  (DE) ..................... 10 2018 119 735.7

(51) Int. Cl.
*B60R 19/18* (2006.01)
*B60R 19/34* (2006.01)
*B60R 19/12* (2006.01)

(52) U.S. Cl.
CPC .............. *B60R 19/18* (2013.01); *B60R 19/12* (2013.01); *B60R 19/34* (2013.01); *B60R 2019/1806* (2013.01); *B60R 2019/1866* (2013.01)

(58) Field of Classification Search
CPC ......... B60R 19/34; B60R 19/18; B60R 19/12; B60R 2019/1806; B60R 2019/1866
See application file for complete search history.

(56) References Cited

U.S. PATENT DOCUMENTS 4,830,416 A   5/1989  Matsuoka
8,950,794 B2  2/2015  Lenkenhoff
(Continued)

FOREIGN PATENT DOCUMENTS

DE    19511868 A1    10/1996
DE    19545069 A1 *   4/1997   ............. B60R 19/18
(Continued)

OTHER PUBLICATIONS

International Search Report (ISR) of the International Searching Authority (ISA) dated Sep. 18, 2019 in parent International application PCT/EP2019/071356.
(Continued)

*Primary Examiner* — D Glenn Dayoan
*Assistant Examiner* — Melissa Ann Bonifazi
(74) *Attorney, Agent, or Firm* — Polson Intellectual Property Law, PC; Margaret Polson; Christopher Sylvain

(57) ABSTRACT

A bumper cross member designed as a hollow chamber profile for a motor vehicle having an upper component and a lower component joined to the upper component. Both components are each designed as a half shell having two legs spaced apart from one another and a web connecting the legs. An insert plate is joined to the legs of the half shells. The insert plate is arranged between the joints of the legs of the half shells facing toward one another and bridges the joint spacing between the legs of the two half shells.

9 Claims, 2 Drawing Sheets

(56) References Cited

U.S. PATENT DOCUMENTS

| | | |
|---|---|---|
| 9,446,799 B2 | 9/2016 | Franzpötter |
| 9,598,100 B2 | 3/2017 | Lenkenhoff |
| 9,764,764 B2 | 9/2017 | Irle |
| 10,005,495 B2 | 6/2018 | Töller |
| 10,577,025 B2 | 3/2020 | Michler |
| 10,882,559 B2 | 1/2021 | Gündogan |
| 2019/0344385 A1 | 11/2019 | Töller |
| 2020/0231107 A1 | 7/2020 | Günther |
| 2020/0254948 A1 | 8/2020 | Töller |
| 2020/0317149 A1 | 10/2020 | Höning |
| 2020/0398895 A1 | 12/2020 | Günther |

FOREIGN PATENT DOCUMENTS

| | | |
|---|---|---|
| DE | 10359483 A1 | 7/2005 |
| DE | 202008017596 U1 | 3/2010 |
| DE | 102010050013 A1 | 5/2012 |
| DE | 102009005606 B9 | 1/2013 |
| DE | 102013200073 A1 | 3/2014 |
| DE | 102015101435 B3 | 7/2016 |
| EP | 1182095 A1 | 2/2002 |
| EP | 2431234 A1 | 3/2012 |
| JP | 2003312404 A | 11/2003 |
| WO | 2006036065 A1 | 4/2006 |
| WO | 2012127417 A1 | 9/2012 |

OTHER PUBLICATIONS

Written Opinion (WO) of the International Searching Authority (ISA) dated Sep. 18, 2019 in parent international application PCT/EP2019/071356.

* cited by examiner

BUMPER FOR A MOTOR VEHICLE

BACKGROUND

The present disclosure relates to a bumper cross member, designed as a hollow chamber profile, for a motor vehicle having an upper component and a lower component joined to the upper component, wherein the upper component and the lower component are each embodied as a half shell having legs spaced apart from one another and a web connecting the legs, wherein an insert plate is joined to the legs of the half shells.

The term bumper cross member used in the context of this disclosure includes such a bumper cross member, regardless of whether it is for passenger vehicles or utility vehicles, in particular trucks, wherein the latter can also be used as underrun protection.

A bumper cross member is known from DE 10 2015 101 435 B3. This previously known bumper cross member comprises an upper P-shaped profiled component and a lower P-shaped profiled component joined to it. Since the two components are rotated 180 degrees in relation to one another and arranged with their protruding legs facing each other, this arrangement provides a hollow chamber profile for forming the bumper cross member having three hollow chambers lying one above the other in the vertical direction. The crash performance of such a bumper cross member having more than two hollow chambers is improved over the design of a bumper cross member having only two hollow chambers or only one hollow chamber. However, the production of such a previously known multi-chamber hollow profile bumper cross member is expensive due to the multiple process steps to be carried out, which also include roll forming to produce the individual components, in particular if they are manufactured from sheet steel.

A two-shell bumper cross member which is composed of an upper shell and a lower shell is known from EP 1 182 095 A1. The profile formed by the two shells is open in the direction of the chassis of the vehicle and therefore has a C-shaped cross section.

A cross member is known from the prior art from DE 10 2009 005 606 B9, which comprises a hat-shaped shell profile arranged on the vehicle chassis side, which is closed by a strike plate facing in the direction of travel. The strike plate is welded to these profile parts on the flanges which are bent over in the vertical direction from the profiled shell profile. A similar concept is known from DE 10 2010 050 013 A1, wherein the strike plate can also be profiled in this previously known bumper cross member Furthermore, a bumper is known from DE 20 2008 017 596 U1 which consists of two essentially symmetrical half shells which are placed against one another in such a way that they delimit a cavity. These two half shells are arranged one above the other so that one half shell forms a lower half shell and a further half shell forms an upper half shell. These two half shells each have a web connecting the legs that are spaced apart from one another. Crash boxes are formed onto the chassis side of this known bumper cross member.

A generic bumper is also known from DE 195 11 868 A1, which has a cross member. This bumper cross member is also constructed from a lower and an upper half shell, the legs of which are spaced apart from one another and are connected to one another by a web. In addition, an insert plate is provided between these two half shells, which is joined to the legs.

These bumper cross members meet the conventional requirements for crash performance. More recently, the IIHS (Insurance Institute for Highway Safety, USA) implemented a so-called "small overlap test" in vehicle testing. In this test, bumper cross members are also exposed to significant side impact forces. The bumper cross members described above sometimes fail these tests. Even if bumper cross members of this type are easy to manufacture, it would be desirable if the crash properties (crash performance) could be improved in relation to the so-called "small overlap test" of the IIHS.

SUMMARY

This aspect is achieved according to the present disclosure by an above-mentioned generic bumper cross member, in which the insert plate is arranged between the joints of the legs of the half shells facing toward one another and bridges the joint spacing between the legs of the two half shells.

This bumper cross member is designed as a hollow chamber profile. The hollow chamber profile is formed by an upper half shell, a lower half shell, and an insert plate inserted between the half shells. The hollow chamber profile is therefore formed having two chambers. This does not rule out that each chamber formed by the half shell can be further subdivided. Both the upper and also the lower half shell have two legs which are spaced apart from one another in the travel direction of the vehicle (x-direction) and which are connected at one end by a web. The half shells are arranged in relation to one another in such a way that the joints formed by the free ends of the legs face toward one another. An insert plate is interposed between the joints of the legs of the half shells facing toward one another. This bridges the joint spacing between the legs of the two half shells. The joints of the one half shell are thus spaced apart or separated from those of the other half shell by the insert plate. The legs of the half shells are welded to the insert plate, typically on the outside. The joint connection of the three components mentioned, which are involved in the construction of the bumper cross member, can be joined in adaptation to the requirements placed on the bumper cross member as a continuous weld seam over the longitudinal extension of the bumper cross member, as a stitched seam having different lengths of the individual welds, or by spot welds.

This bumper cross member has a significantly improved crash performance, especially with respect to the "small overlap test". The insert plate arranged between the joints of the legs and the joint connection between this and the legs of the half shells effectively counteracts buckling of the bumper cross member transversely to its longitudinal extension. This is due not only to the fact that the provision of the insert plate requires more energy for deformation of the bumper cross member and thus more energy is absorbed in the event of a crash, but in particular also because a force acting in the horizontal direction on the bumper cross member is not only absorbed via the insert plate, because it is joined to the spaced-apart legs of the two half shells, but also via the half shells themselves and transferred to the rear connection of the bumper cross member to the vehicle. The spatial position of the legs is fixed by joining the insert plate to the legs. Conversely, the legs joined to the insert plate counteract both tensile and compressive stresses acting in the horizontal plane on the insert plate. In a "small overlap test", the end section of the bumper cross member that is on the outside in the x-direction is subjected to tensile stress outside of its connection to a longitudinal member of the vehicle, while compressive stress acts on the inside of the bumper cross member. When subjected to pressure, the insert plate attempts to undulate, but this is effectively prevented by the legs of the two half shells that stand on it and are joined to the insert plate. The same applies to the tension side, on which tearing of the insert plate is also effectively counteracted by the legs of the half shells connected to it.

The concept described above enables the bumper cross member to be produced from the three components without great effort. This means that they can be manufactured with basically the same production steps as is the case with previously known bumper cross members composed of multiple components. Above all, it is easily possible to produce these from sheet steel parts. The insert plate is preferably a steel plate stamped into shape.

The concept of arranging an insert plate between the joints of the legs of the half shells facing toward one another, bridging the joint spacing of the legs of the two half shells, and joining it with the legs of the half shells, also enables the crash performance of the bumper cross member to be adapted to the respective requirements solely by modifying the insert plate. This can be done via the geometry of the insert plate, therefore its geometry in the x-y plane and/or also with regard to its thickness and/or with regard to the material used and/or the material quality used. The crash performance may be influenced, for example, by varying the material thickness of the insert plate. Influencing the geometry in the x-y plane of the bumper cross member includes the possibility that the insert plate protrudes on the front and/or rear over the outside of the legs of the half shells facing in the x direction. This excess enlarges the area of the insert plate effective against buckling, and therefore significantly increases the force required to buckle such a bumper cross member, for example in the context of a "small overlap test".

In the case of the bumper cross member according to the present disclosure, when the same half shells are used, the crash performance can be influenced solely by using differently designed insert plates on the structure of the bumper cross member, so that in different bumper cross member series these can be produced with identical parts with respect to the half shells and can be differentiated simply by switching in a differently designed insert plate between the joints of the half shells.

The width of the protruding excess of the insert plate can be the same on the front and rear. The width of the excess protruding at the front can also be smaller than the width of the rear excess facing toward the chassis of the vehicle—for example due to limitations in the available installation space. The same also applies in the opposite case that the front excess is larger than the rear. The excess of the insert plate can also be bent at the front and/or rear, typically in the plane of one of the two legs of the half shells.

A further improvement in the crash performance of such a bumper cross member, which has an excess due to its insert plate at the rear and thus facing towards the chassis of the vehicle, can be achieved if the rear excess is notched in this connection region to connect the bumper cross member to a longitudinal member component, typically a crash box. What is achieved hereby is that the end face of the excess formed by the notch and facing towards the center of the bumper cross member is supported on the side of the longitudinal member component facing outward in the y-direction. This lateral support of the bumper cross member on the longitudinal member component results in further improved lateral impact protection. This effect can be increased by the fact that the width of the projection facing toward the chassis increases in the direction of the notch. The support on the side wall of the longitudinal member component is then correspondingly longer and more effective.

Interestingly, it has been shown that despite the weakening of the bumper cross member by such a notch, this is more than compensated for by the above-described lateral support of the front face of the notch facing towards the center.

The interposing of an insert plate between the joints of the legs of two half shells facing toward one another and the resulting significantly improved crash performance takes place without any significant increase in the weight of the bumper cross member. This is also because the joining or assembly flanges fundamentally required in the prior art are basically not required on the half shells. In addition, due to the above-described force distribution in the event of a crash via the components involved in the construction of the bumper cross member, a material with a lower material thickness can sometimes also be used by providing such an insert plate. In this respect, such a bumper cross member can be designed to be weight-optimized.

A further weight reduction can be achieved if the insert plate has recesses. These are openings introduced into the insert plate which are used for reducing weight. The recesses will be arranged in such a way that the desired force-transmitting properties of the insert plate are retained. These recesses can have any shape, for example circular, rectangular, star-shaped, or the like. The remaining structure of the insert plate is decisive, for example in the manner of a framework by which the spaced-apart legs of the half shells are connected to one another.

The directions mentioned in the context of this disclosure—x-direction, y-direction, or z-direction—are the directions commonly used in the industry for motor vehicles. The x-direction corresponds to the longitudinal extension of the vehicle, the y-direction to the transverse extension of the vehicle, and the z-direction to the direction of the height of the vehicle.

BRIEF DESCRIPTION OF THE DRAWINGS

The following description is provided using an example embodiment with reference to the attached figures, wherein.

DETAILED DESCRIPTION

Figure 1:
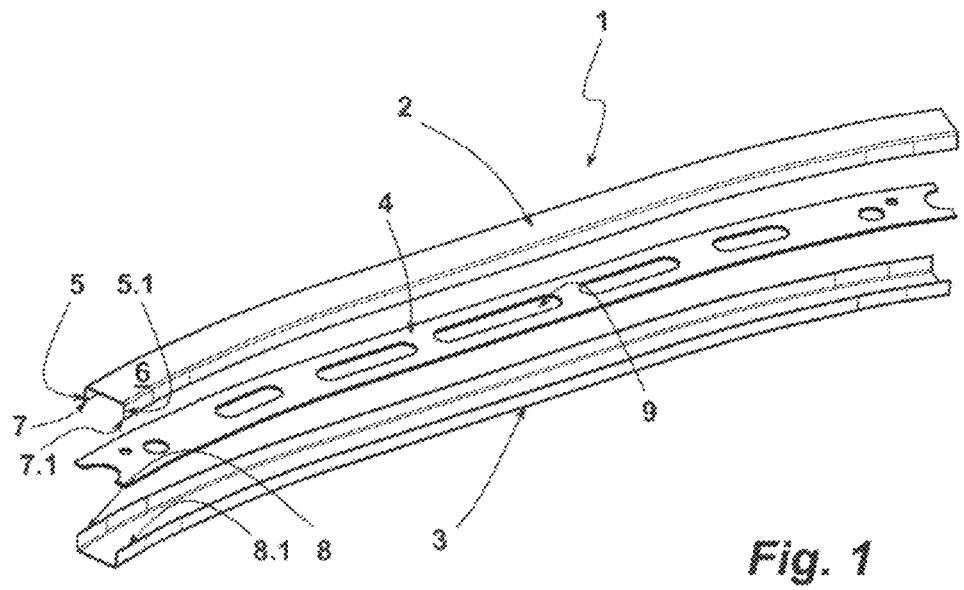
FIG. 1 shows an exploded view of a bumper cross member according to the present disclosure.

The bumper cross member 1 shown in FIG. 1 comprises an upper half shell 2 and a lower half shell 3 as well as an insert plate 4 arranged between the half shells 2, 3. Both half shells 2, 3 are basically constructed in the same way. The half shell 2 is formed by two legs 5, 5.1 which are spaced apart from one another and a web 6 connecting the legs 5, 5.1. In the illustrated embodiment, the legs 5, 5.1 are formed at right angles onto the web 6, which is straight in this example embodiment. The free ends of the legs 5, 5.1 opposite the web 6 each form a joint 7, 7.1. The half shells 2, 3 are arranged with their joints 7, 7.1 and 8, 8.1 facing toward one another. The joints 7, 7.1; 8, 8.1 are in the x-y plane. The legs 5, 5.1 thus extend in the vertical direction (z-direction).

In the illustrated embodiment, the web 6 of each half shell 2, 3 is straight. It is entirely possible to reinforce the web 6 by embossing, for example by means of beads extending in the transverse direction to the longitudinal extension of the respective half shell 2, 3. Between the joints 7, 8; 7.1, 8.1 facing toward one another, the insert plate 4 is arranged, which bridges the joint spacing of the legs 5, 5.1 of the two half shells 2, 3. The joint spacing is the distance between the two joints 7, 7.1 and 8, 8.1 of each half shell 2, 3 from one another. To reduce weight, recesses 9 are introduced into the insert plate 4. In the present case, the geometry and the size of the recesses 9 are selected in such a way that the desired properties of the insert plate 4 are retained with regard to its desired stiffening effect together with the two half shells 2, 3. The recesses 9 are embodied like slots in the middle section of the bumper cross member 1. In the outer sections relevant for the "small overlap test", the recesses are circular. Between the circular recesses and the slot-like recesses 9, there is a section of the metal insert 4 without recesses. In this region, a crash box 10, 10.1 (see FIG. 2) is connected in each case to the rear of the bumper cross member 1.

Figure 2:
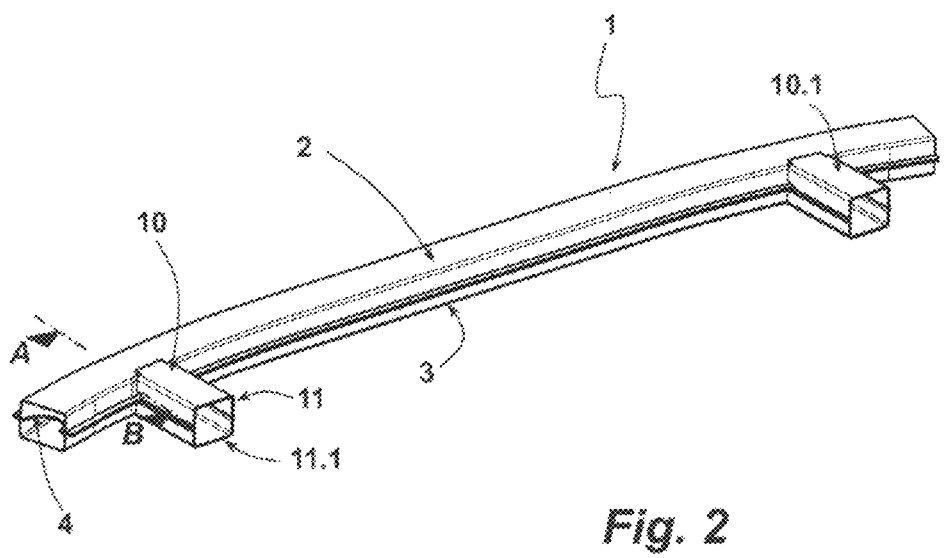
FIG. 2 shows the bumper cross member of FIG. 1 having its components joined together, on the rear side of which two crash boxes are connected as longitudinal member components.

FIG. 2 shows the bumper cross member 1 shown in FIG. 1 with regard to its individual components 2, 3, 4 after they have been welded together. This combined representation of the bumper cross member of FIG. 1 makes it clear that the insert plate 4 protrudes over the outer sides of the legs 5, 5.1 of the half shells 2, 3 on the front and rear facing toward the chassis of the vehicle. The three components to be welded, the upper half shell 2, the lower half shell 3, and the insert plate 4 bridging the joint spacing between the half shells 2, 3, are welded to one another in such a way that the insert plate 4 protrudes with an excess of equal width, both at the rear towards the chassis of the vehicle and in reverse direction at the front, over the outside of the legs 5, 5.1.

Furthermore, FIG. 2 shows how the bumper cross member 1 can be connected to crash boxes 10, 10.1 as longitudinal member components. The structure of the crash box 10 and its connection to the bumper cross member 1 are explained below. The crash box 10.1 is constructed and connected to the bumper cross member 1 in the same way, so that these explanations apply equally to the crash box 10.1. The crash box 10 is formed from two half shells 11, 11.1 corresponding to one another. The crash box 10 has on its upper belt and on its lower belt an extension which extends over the upper side of the web 6 of the half shell 2 or over the lower side of the web of the half shell 3, respectively, and forms a U-shaped receptacle for inserting the rear of the bumper cross member 1. Both shells 11, 11.1 of the crash box 10 have a notch on their side facing toward the outside of the legs 5.1 of the half shells 2, 3 so that the end face of the crash box 10 can also rest against the rear of the bumper cross member 1 without the weld beads 12, via which the half shells 2, 3 are welded to the insert plate 4, obstructing such a contact. The upper half shell 11 of the crash box 10 also has a recess in extensions of this notch, into which the rear excess of the insert plate 4 protrudes.

Figure 3:
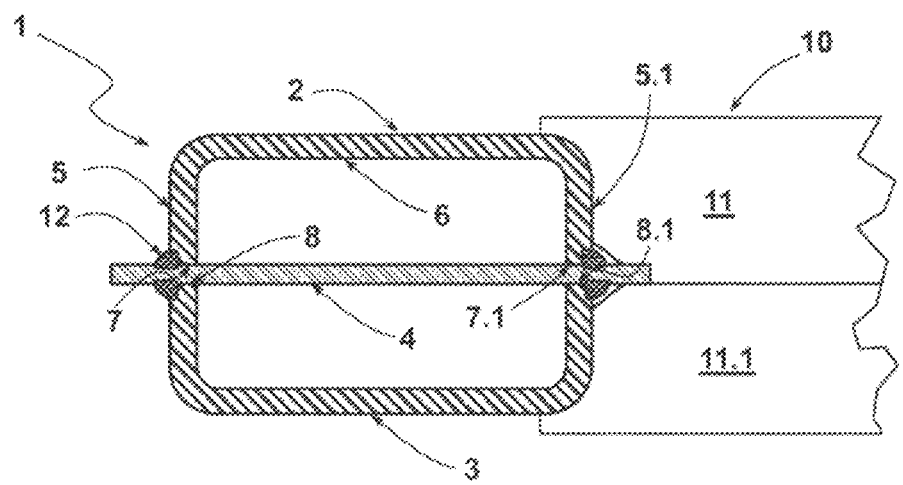
FIG. 3 shows a schematic sectional view of the welded assembly of FIG. 2 along line A-B.

FIG. 3 shows the above-described bumper cross member 1 in a sectional view. The insert plate 4 interposed between the joints 7, 8; 7.1, 8.1 of the half shells 2, 3 facing toward one another, which in this embodiment protrudes both on the rear in the direction of the chassis of the vehicle and also in the reverse direction on the front over the outside of the respective legs 5, 5.1, is welded on the four outside fillets, which are formed by the sheet metal insert 4 and the legs 5, 5.1 which adjoin it at right angles in the illustrated example embodiment. In the embodiment shown, the welding takes place over the entire length of the bumper cross member 1. The welding beads are identified in FIG. 3 with the reference symbol 12. The sectional view in FIG. 3 shows that during the process of joining the two half shells 2, 3 to the insert plate 4, the insert plate 4 provides an effective weld pool support. Tests have shown that an effective weld pool support is provided when the insert plate protrudes only a few tenths of a millimeter above the outer surface of the legs 5 or 5.1 of the half shells 2, 3.

The construction of the bumper cross member 1 described makes it stable and, above all, rigid, in particular with respect to buckling. The reason for this is that, when a force acts on the side of the bumper cross member 1 shown on the left in FIG. 3, with the stiffening of the joint spacing and the provision of several load paths, the force acting on this side of the bumper cross member 1 on the rear is thus transmitted in the direction toward the crash boxes 10, 10.1. These load paths are the two half shells 2, 3 and the insert plate 4. Due to this construction, in the event of a compressive stress of the insert plate in the x-y plane, undulation of the legs 5, 5.1 of the two half shells 2, 3 standing thereon and joined to the insert plate 4 is effectively counteracted. This applies similarly to the front tension side.

In the illustrated embodiment, the joint spacing of the two half shells 2, 3 is the same. In another example embodiment, not shown in the figure, the joint spacing of the legs of the two half shells is different so that, for example, the upper half shell can have a slightly larger joint spacing than the lower one or vice versa. By providing the insert plate, two half shells which have a different material thickness can also be joined together.

To stiffen the legs of the two half shells, beads following the longitudinal extension of the bumper cross member 1 can be introduced into them. These can be limited to the sections of the bumper cross member 1 that are on the outside in the y direction and are relevant with regard to the "small overlap test". If the middle section is also to be made more rigid, such beads can also be arranged in these leg sections.

The invention has been described with reference to the figures on the basis of example embodiments. Without departing the scope of the claims, numerous modifications and further embodiments result for a person skilled in the art for implementing the invention without having to explain or show the same in greater detail in the scope of these statements.

LIST OF REFERENCE SIGNS

1 bumper cross member
2 upper half shell
3 lower half shell
4 insert plate
5, 5.1 leg
6 web
7, 7.1 joint of the upper half shell
8, 8.1 joint of the lower half shell
9 recess
10 crash box
11 upper half shell of the crash box
11.1 lower half shell of the crash box
12 welding bead

The invention claimed is:

1. A bumper cross member embodied as a hollow chamber profile for a motor vehicle, comprising:

an upper component and a lower component, wherein the upper component and the lower component are each embodied as a half shell having two legs spaced apart from one another and a web connecting the legs, an insert plate joined to the legs of the half shells, wherein the insert plate is arranged between joints of the legs of the half shells facing toward one another and bridges the joint spacing between the legs of the two half shells, wherein a rear excess of the insert plate protrudes on a rear of the half shells in a direction of a chassis of the motor vehicle and/or a front excess of the insert plate protrudes on a front of the half shells over the outside of the legs.

2. The bumper cross member of claim 1, wherein the insert plate has both the front excess and the rear excess, and the protruding width of the front excess is the same as the protruding width of the rear excess facing toward the chassis of the motor vehicle.

3. The bumper cross member of claim 1, wherein the insert plate has both the front excess and the rear excess, and the protruding width of the front excess is smaller than the protruding width of the rear excess facing toward the chassis of the motor vehicle.

4. The bumper cross member of claim 1, wherein the front and/or rear excess of the insert plate is bent in relation to an outer end of one of the legs of the half shells facing in this direction.

5. The bumper cross member of claim 1, wherein the rear excess of the insert plate protruding towards the chassis of the motor vehicle is notched in regions for connecting a longitudinal member of the motor vehicle, and wherein an end face of the rear excess provided by a notch and facing toward a center of the bumper cross member is supported on a side of the longitudinal member component facing outward in the y-direction.

6. The bumper cross member of claim 5, wherein the protrusion width of the rear excess increases in a direction of the end face provided by the notch and supported on the side of the longitudinal member component.

7. The bumper cross member of claim 5, wherein the bumper cross member is provided as a longitudinal member component for connection to a crash box.

8. The bumper cross member of claim 1, wherein the insert plate has recesses in a section thereof located between the legs and at a distance from the legs.

9. The bumper cross member of claim 1, wherein the half shells and the insert plate are sheet steel components.

* * * * *